(12) United States Patent  (10) Patent No.: US 9,404,676 B2
Palmieri et al.  (45) Date of Patent: Aug. 2, 2016

(54) VACUUM SOLAR THERMAL PANEL WITH PIPE HOUSING

(75) Inventors: Vittorio Palmieri, Geneva (CH); Francesco Di Giamberardino, Colleferro (IT)

(73) Assignee: TVP SOLAR S.A. (CH)

( * ) Notice: Subject to any disclaimer, the term of this patent is extended or adjusted under 35 U.S.C. 154(b) by 838 days.

(21) Appl. No.: 13/339,398

(22) Filed: Dec. 29, 2011

(65) Prior Publication Data

US 2012/0186578 A1  Jul. 26, 2012

(30) Foreign Application Priority Data

Dec. 30, 2010 (EP) ..................................... 10197369

(51) Int. Cl.
*F24J 2/46* (2006.01)
*F24J 2/50* (2006.01)
*F24J 2/52* (2006.01)

(52) U.S. Cl.
CPC .......... F24J 2/507 (2013.01); *F24J 2002/5275* (2013.01); *Y02E 10/40* (2013.01)

(58) Field of Classification Search
CPC ....... F24J 2/05; F24J 2/507; F24J 2002/4665; F24J 2002/5275; F24J 2/265
USPC ........................... 126/651–677; 165/172–184
See application file for complete search history.

(56) References Cited

U.S. PATENT DOCUMENTS

| | | | | |
|---|---|---|---|---|
| 1,334,545 A | * | 3/1920 | Londelius, Jr. .............. | 248/68.1 |
| 2,038,912 A | * | 4/1936 | Summers ...................... | 165/150 |
| 2,819,858 A | * | 1/1958 | Mittendorf ................... | 248/74.2 |
| 2,896,887 A | * | 7/1959 | Beltz ............................... | 248/49 |
| 3,233,852 A | * | 2/1966 | Azar ............................. | 248/68.1 |
| 3,627,300 A | * | 12/1971 | Caveney et al. .............. | 269/131 |
| 3,924,676 A | * | 12/1975 | Bennett ......................... | 165/172 |
| 3,952,725 A | * | 4/1976 | Edmondson .................. | 126/659 |
| 3,961,619 A | * | 6/1976 | Estes et al. .................... | 126/666 |
| 4,080,957 A | * | 3/1978 | Bennett ......................... | 126/636 |
| 4,122,829 A | * | 10/1978 | Lowe et al. ................... | 126/651 |
| 4,131,258 A | * | 12/1978 | Okuda et al. .................... | 248/73 |
| 4,164,935 A | * | 8/1979 | Marles et al. ................. | 126/659 |
| 4,164,975 A | * | 8/1979 | Bottum ......................... | 165/68 |
| 4,213,640 A | * | 7/1980 | Miles ........................ | 285/124.2 |
| 4,289,113 A | * | 9/1981 | Whittemore .................. | 126/570 |
| 4,332,241 A | * | 6/1982 | Dalstein et al. ............... | 126/711 |
| 4,338,994 A | * | 7/1982 | Hewing et al. ................. | 165/49 |
| 4,577,435 A | * | 3/1986 | Springer et al. ..................... | 47/2 |

(Continued)

FOREIGN PATENT DOCUMENTS

AT          7834 U1     9/2005
DE       4430106 A1    2/1996

(Continued)

*Primary Examiner* — Jorge Pereiro
(74) *Attorney, Agent, or Firm* — Melvin K. Silverman

(57) ABSTRACT

The present application relates to a vacuum solar thermal panel with pipe housing (1) for a solar absorber pipe (10) of the type comprising at least a base portion (2) and a retention element (3) for the pipe (10). Advantageously according to the invention, the retention element (3) is in the form of a fork and has an elastic behavior when forced by the pipe (10). The vacuum solar thermal panel with pipe housing (1) according to the invention avoids the risk of a vertical movement of the pipe and then of the solar absorber being associated to the pipe while allowing an easy insertion or mounting of the pipe itself during the assembly or manufacturing of the vacuum solar thermal panel.

10 Claims, 2 Drawing Sheets

(56) References Cited

U.S. PATENT DOCUMENTS

| | | | | |
|---|---|---|---|---|
| 4,616,486 A * | 10/1986 | Ohashi | | 62/235 |
| 4,657,069 A * | 4/1987 | Easton | | 165/76 |
| 4,681,288 A * | 7/1987 | Nakamura | | 248/71 |
| D292,554 S * | 11/1987 | Yagi | | D8/396 |
| D293,205 S * | 12/1987 | Nakano | | D8/395 |
| D293,207 S * | 12/1987 | Nakano | | D8/396 |
| 4,709,556 A * | 12/1987 | Hupfer | | 62/298 |
| D302,938 S * | 8/1989 | Fujioka | | D8/356 |
| 4,876,810 A * | 10/1989 | Piana et al. | | 40/316 |
| 4,881,521 A * | 11/1989 | Kellner | | 126/658 |
| 5,074,282 A * | 12/1991 | Reed | | 126/588 |
| 5,327,737 A * | 7/1994 | Eggemar | | 62/66 |
| 5,454,428 A * | 10/1995 | Pickard et al. | | 165/49 |
| 5,467,948 A * | 11/1995 | Gillespie | | 248/68.1 |
| 5,588,857 A * | 12/1996 | Feldmeier et al. | | 439/248 |
| 5,743,330 A * | 4/1998 | Bilotta et al. | | 165/183 |
| 6,216,987 B1 * | 4/2001 | Fukuo | | 248/74.2 |
| 6,557,317 B2 * | 5/2003 | Sorkin | | E04C 5/20 404/135 |
| 6,955,168 B2 * | 10/2005 | Nakauchi | | 126/650 |
| 6,969,832 B1 * | 11/2005 | Daughtry, Sr. | | 219/531 |
| 7,364,321 B2 * | 4/2008 | Chen et al. | | 362/225 |
| 7,523,898 B1 * | 4/2009 | Barry et al. | | 248/71 |
| 7,556,225 B2 * | 7/2009 | Riedy et al. | | 248/68.1 |
| 7,810,491 B2 * | 10/2010 | Benvenuti | | 126/653 |
| D654,600 S * | 2/2012 | Devine et al. | | D25/138 |
| 8,499,823 B1 * | 8/2013 | Shaw et al. | | 165/53 |
| 2005/0028966 A1 * | 2/2005 | Pickard | | 165/168 |
| 2005/0173597 A1 * | 8/2005 | Farrell et al. | | 248/68.1 |
| 2007/0039611 A1 * | 2/2007 | Benvenuti | | 126/652 |
| 2008/0011289 A1 * | 1/2008 | Sichanugrist et al. | | 126/634 |
| 2010/0108825 A1 * | 5/2010 | Brock | | 248/73 |
| 2011/0146667 A1 * | 6/2011 | Benvenuti | | 126/653 |

FOREIGN PATENT DOCUMENTS

| | | | | |
|---|---|---|---|---|
| DE | EP 1538403 A2 * | 6/2005 | | F24J 2/265 |
| EP | 1496320 A1 | 1/2005 | | |
| EP | 2211079 A1 | 7/2010 | | |
| WO | 2009149753 A1 | 12/2009 | | |

* cited by examiner

VACUUM SOLAR THERMAL PANEL WITH PIPE HOUSING

FIELD OF APPLICATION

The present invention relates to a vacuum solar thermal panel with pipe housing for a solar absorber pipe.

PRIOR ART

As it is well known, vacuum solar thermal panels comprise at least a flat vacuum tight envelope with a glass plate transparent to visible solar radiation. Inside the vacuum envelope are disposed heat absorbers and a pipe entering and exiting the envelope connected to the heat absorbers.

The solar radiation thus enters the vacuum envelope through the glass plate, is absorbed by the heat absorbers and converted into heat. The converted heat is transferred to the pipe and to a heat transfer fluid flowing in the pipe.

Vacuum is kept inside the envelope enclosing the heat absorbers and part of the pipe connected to them, in order to prevent heat from escaping to the external environment by means of convection.

A vacuum solar thermal panel of the known type is described for instance in the PCT application published under No. WO 2010/003653 in the name of the same Applicant.

It is known that vacuum solar thermal panels require a support structure for the glass plate which is also used for firmly holding in place the solar absorber.

It is also known that the efficiency of a vacuum solar thermal panel is limited by thermal losses and that, when the internal pressure is low enough to suppress convection, only conduction and radiation losses remain. Conduction losses are thus caused by the inevitable contact points between the solar absorber pipe and its support frame.

According to the prior art solutions, conduction losses are limited by reducing the number of contact points between the solar absorber pipe and its support frame and by providing long thermal paths from these points to the vacuum envelope, which is at ambient temperature during panel operation.

Existing thermal panels essentially comprise a frame equipped with spacers, which cross one another and support the glass plate against a metallic panel bottom. The network-like path defined by the spacers creates a plurality of areas wherein the heat absorbers are housed.

Typical low conduction loss pipe housings, being normally shaped like a fork with protruding edges to accommodate the pipe, are used in vacuum solar thermal panels.

A known type of this low conduction loss pipe housing is described for instance in the PCT application published under No. WO 2010/023074 in the name of the same Applicant. According to this application, as shown in its FIGS. 5 and 6, specially shaped cut holes are provided in longitudinal elements, to support a traversing head absorber pipe, allowing for pipe expansion with increasing temperature. In this way, a compensation of the thermal expansion of the pipe is provided, without increasing the weight of the thermal panel structure as a whole. Another solution for housing and centring a head absorber pipe is described in the PCT application published under No. WO 2009/149753. According to this other known solution, recessed areas (or seats) are obtained in transversal spacers and with the help of protruding edges it is possible to accommodate correctly the pipes into the panel. Additional features are put in place to limit the thermal contact of the pipe with the frame, by inserting, in the seats, spacers in loose contact with the pipe.

In this way, the pipe (and therefore the solar absorber) is centred horizontally into the structure and will not be able to move apart. The major drawback of this latter solution is the freedom of vertical movement left to the pipe-absorber structure.

It is known that vacuum solar thermal panels can reach very high temperatures in case of stagnation, i.e. when panel is exposed to maximum solar irradiance and the heat transfer fluid does not flow inside the pipe. Therefore the solar absorber, composed by a selective metal sheet welded to a metal pipe, tends to elongate and/or bend the pipe.

In particular, a pipe of copper, typically 1.5 meters long and welded to a selective copper sheet of same length as usually employed in solar thermal panels, when heated at a temperature of 400° C. will expand by 10 mm.

The known solutions, while allowing for pipe elongation, do not allow for pipe retention in the vertical direction and this may cause the solar absorber to eventually contact the glass plate adding additional conduction losses. This conduction path from the solar absorber to the ambient temperature will dramatically reduce the efficiency of the solar thermal panel This is of particular relevance in the case of vacuum solar thermal panel of reduced thickness, where the distance between the selective metal sheet of the solar absorber and the facing glass plate is less than 10 mm.

The technical problem underlying the present invention is that of providing a vacuum solar thermal panel with low conduction loss pipe housing providing self-retention of the pipe in the vertical direction, in this way overcoming the limits which still affect the housings realised according to the prior art.

SUMMARY OF THE INVENTION

The solution idea underlying the present invention is that of providing a retention mechanism which prevents a pipe from moving in the vertical direction when housed in a low conduction loss pipe housing, while allowing its thermal expansion in the longitudinal direction and an easy insertion or mounting of the pipe itself during the assembly or manufacturing of the vacuum solar thermal panel.

On the basis of such solution idea the technical problem is solved by a vacuum solar thermal panel with pipe housing for a solar absorber pipe of the type comprising at least a base portion and a retention element for said pipe, characterized in that said retention element is in the form of a fork and has an elastic behaviour when forced by said pipe.

This retention element comprises a first and a second tine both protruding from said base portion and being mirrored one another, and defining an open housing space therebetween having different widths starting from said base portion up to an opening inlet for said pipe, said open housing space where said pipe is housed being wider than a diameter of said pipe.

Moreover, the retention element comprises a first portion having an increasing opening width from a first opening width to a second opening width that is greater than said first opening width, and a second portion having a decreasing opening width from said second opening width to a third opening width.

The tines of said retention element comprise retaining edges at their tips and define said opening inlet which has a fourth opening width that is smaller than said second opening width.

Advantageously, the second opening width has a value in range of 110%-150% of a diameter of said pipe.

The fourth opening width has a value in range of 90-97% of the diameter of said pipe.

Advantageously, the retention element is made of stainless steel.

The base portion and the retention element with its tines have a same and substantially constant thickness. In particular, they are realized by moulding or by sheet cutting.

The thickness of the base portion and of the tines is substantially constant, being realized by moulding or by sheet cutting.

Moreover, advantageously according to the invention, the vacuum solar thermal panel with pipe housing further comprises spacers disposed in a transverse direction with respect to the base portions of the retention elements and provided with uprights support elements which abut against the glass plate of the vacuum solar thermal panel.

Furthermore, the vacuum solar thermal panel with pipe housing further comprises a continuous solar absorber provided with holes for allowing the uprights support elements of the spacers to cross the continuous solar absorber and abut against the glass plate of the vacuum solar thermal panel.

The characteristics and advantages of the vacuum solar thermal panel with pipe housing according to the invention will be apparent from the following description.

DETAILED DESCRIPTION

Figure 1:
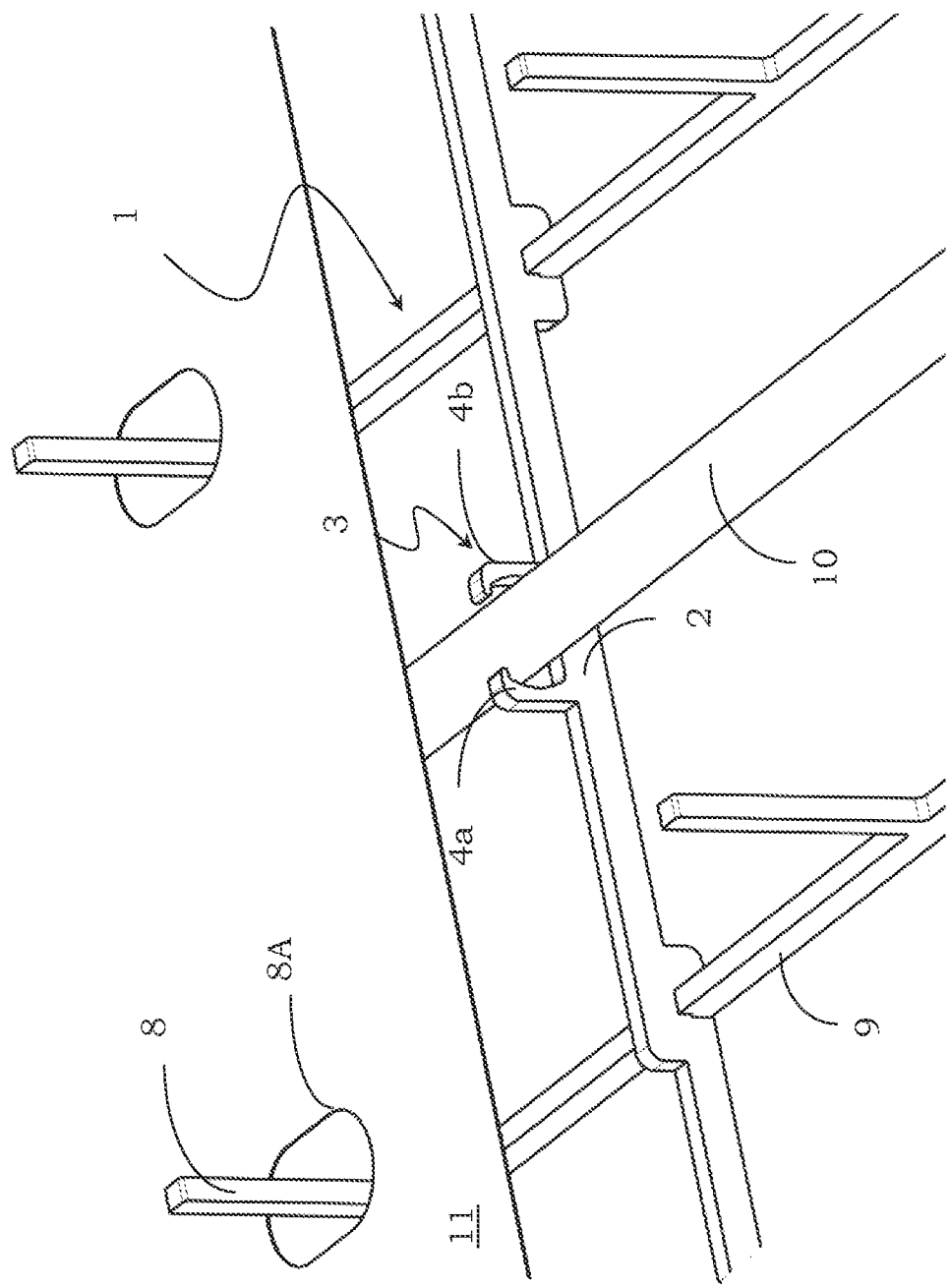
FIG. 1 schematically shows a pipe housing of a vacuum solar thermal panel according to an embodiment of the present invention on a transverse spacer assembly.
Figure 2:
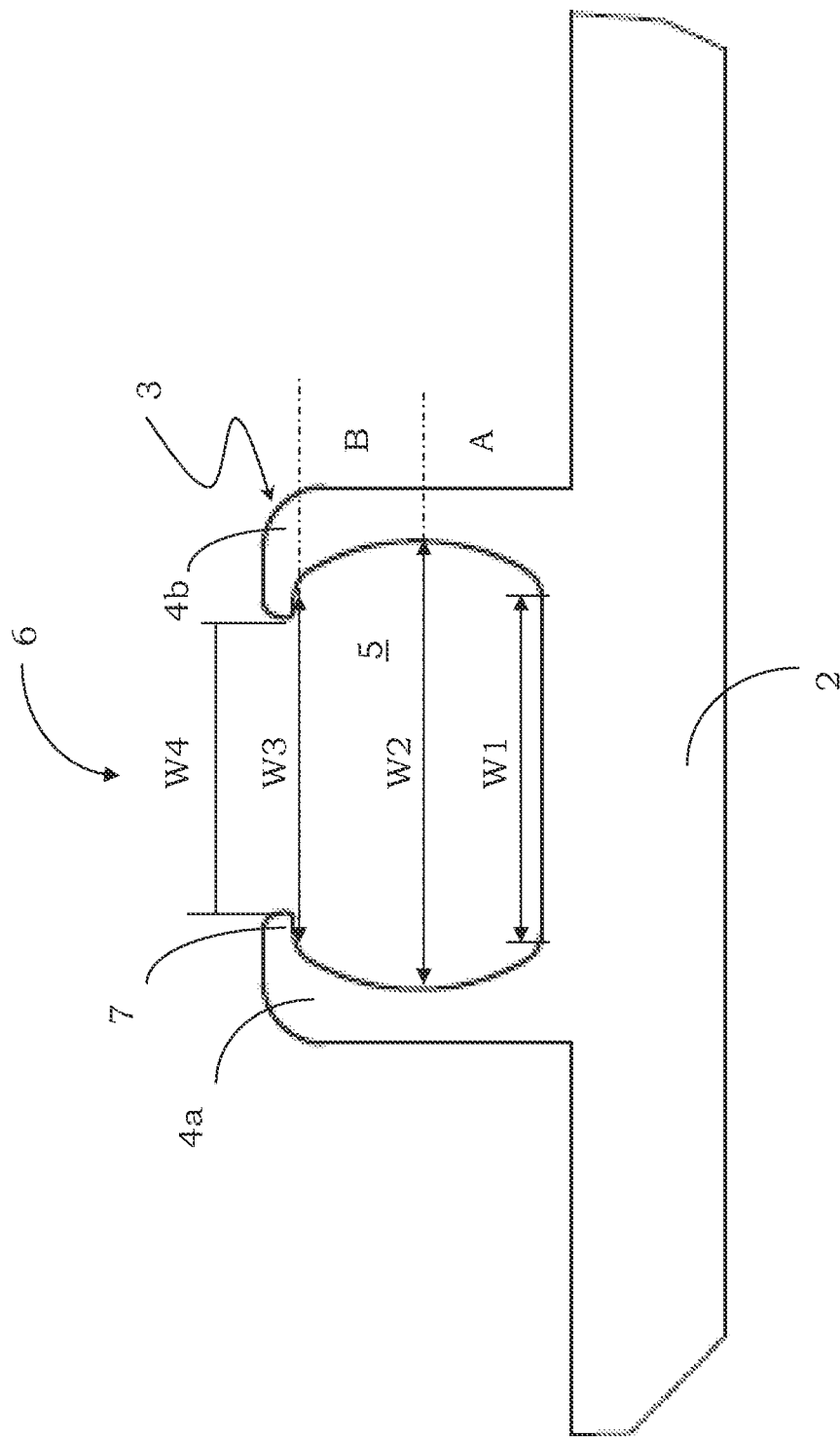
FIG. 2 schematically shows a self clamping fork of the pipe housing of a vacuum solar thermal panel according to an embodiment of the present invention.

With reference to such figures, and in particular to FIG. 1, a pipe housing of a vacuum solar thermal panel being realised according to an embodiment of the invention is shown and globally indicated with 1.

More in particular, the pipe housing 1 comprises a base portion 2 and at least a retention element 3, in the form of a fork.

Advantageously according to an embodiment of the invention, the retention element 3 comprises a first tine 4a and a second tine 4b both protruding from the base portion 2 and being mirrored one another, and defining an open housing space 5 therebetween having different widths starting from the base portion 2 up to an opening inlet 6. The open housing space 5 will properly house a pipe 10 of the vacuum solar thermal panel comprising the pipe housing 1.

In particular, the tines 4a and 4b are substantially C shaped and the retention element 3 thus comprises a first portion A having an increasing opening width from a first opening width W1 to a second opening width W2, being greater than the first opening width W1, and a second portion B having a decreasing opening width from the second opening width W2 to a third opening width W3, preferably equal to the first opening width W1. Advantageously according to an embodiment of the invention, the tines of the retention element 3 comprise retaining edges 7 at their tips, thus defining the opening inlet 6 which has a fourth opening width W4, which is smaller than the second opening width W2.

For instance, for a pipe having an external diameter equal to 10 mm, the first opening width W1 and the third opening width W3 may be 11 mm, the second opening width W2 may be 14.5 mm and the fourth opening width W4 may be 9.5 mm. In this way, the retention element 3 provides for a self-retention of the pipe being housed into it, in particular in the vertical direction considering the local reference system of FIG. 1.

In particular, the second opening width W2 is bigger than the pipe diameter while the fourth opening width W4 is smaller than the pipe diameter. Suitable values for the second opening width W2 are among 110-150% of the pipe diameter, while suitable values for the fourth opening width W4 are among 90-97% of the pipe diameter.

In a preferred embodiment, the retention element 3 is made of stainless steel and has a thickness of 2 mm having both elastic behaviour and strength to insert and then retain the pipe.

The mechanism of self-retention is enabled by the elastic behaviour of retention element 3 in the form of a fork, having appropriate thicknesses of its tines, 4a and 4b, and the two retaining edges 7 at its tip. In particular, the thicknesses of the tines, 4a and 4b, of the 3 should be chosen in such a way that the retention element 3 shows an elastic behaviour when forced by a solar absorber pipe 10 as shown in FIG. 1.

More in particular, once the solar absorber pipe 10 is pressed against the retention element 3 in correspondence with its opening inlet 6, it widens because of it elasticity to let the pipe 10 go inside the open housing space 5. Then it closes back to its original width preventing the pipe 10 to move upward by means of the retaining edges 7 at its tip, as shown in FIG. 1 on a transverse assembly of the spacers 9 of the vacuum solar thermal panel. In particular, spacers 9 are disposed in a transverse direction with respect to the base portions 2 of the retention elements 3.

Moreover, advantageously according to the invention, the spacers 9 comprises uprights support elements 8 which abut against the glass plate of the vacuum solar thermal panel, traversing the selective metal sheet of the solar absorber provided with suitable holes.

It is to be remarked that the pipe housing 1 of the vacuum solar thermal panel according to the invention avoids the risk of a vertical movement of the pipe and then of the solar absorber associate to the pipe 10 while allowing an easy insertion or mounting of the pipe itself during the assembly or manufacturing of the vacuum solar thermal panel.

In fact, the tines 4a and 4b of the retention element 3 provide a self-retention of the solar absorber pipe in the vertical direction. However, it should be underlined that the retention element 3 has a long thermal path because the housing space 5 where the pipe 10 is accommodated is wider than the pipe diameter and the pipe can thus expand and move freely in the longitudinal direction within the retention element 3 without being allowed move upward or downward thanks to the retaining edges 7.

Moreover, the pipe housing 1 of the vacuum solar thermal panel according to the invention, comprising the spacers 9 and the uprights support elements 8 traversing the solar absorber 11 provided with suitable holes 8A, allows to further elongate the thermal path between the solar absorber and the glass plate, as well to use a continuous solar absorber 11.

In fact, the continuous solar absorber 11 of the vacuum solar thermal panel according to the present invention has an increased active area than the solar absorbers of the known solutions, for instance the one described in the PCT application published under No. WO 2009/149753, which comprises a plurality of absorbing elements, each connected to a cooling pipe, the longitudinal spacers inside the solar panel having their whole upper edge in contact with the glass plate. In particular, the spacers according to this known solution can shade part of the absorbing elements reducing their respective active area.

On the contrary, advantageously according to the present invention, only small holes 8A for the uprights support elements 8 of the spacers 9 are to be provided in a single continuous solar absorber 11 thus maximising its surface as well as minimising any shading caused by the spacers 9.

In this way, a vacuum solar thermal panel with a low conduction loss pipe housing, which allows for pipe self-retention in the vertical direction, is obtained.

Obviously, a technician of the field, aiming at meeting incidental and specific needs, will bring several modifications to the above described vacuum solar thermal panel with pipe housing, all within the scope of protection of the invention as defined by the following claims.

The invention claimed is:

1. A vacuum solar thermal panel comprising:
   (a) at least one solar absorber pipe;
   (b) a solar absorber plate thermally associated with said solar absorber pipe; and
   (c) a pipe housing for the solar absorber pipe having a base portion and a retention element for said pipe, the retention element depending upwardly from said base portion, said element in the form of a fork having left and right tines of like mirrored geometry, each tine having an inwardly directed retaining tip, said tines in combination with said base portion having a resilient character, permitting urging apart of said tines by said solar absorber pipe, said base portion and said tines defining an open housing space therebetween having different cross-sectional widths as measured in parallel with said base portion, said cross-sections greatest at a vertical center of said housing exiting at a mouth of said housing, said mouth having a cross-section less than that of said pipe, said greatest cross-section proportioned to exceed a diameter of said pipe, allowing for expansion thereof within the tines, each inwardly directed retaining tip of each tine located above said base at a distance allowing slidable freedom of longitudinal movement of a pipe without permitting measurable movement vertically within said housing space, in which the solar absorber pipe is in contact with the solar absorber plate through said mouth of said housing
   (d) the solar absorber pipe has a substantially cylindrical shape and is tangentially in contact with the solar absorber plate through said mouth of said housing.

2. The vacuum solar thermal panel according to claim 1, wherein said retention element comprises a first portion having an increasing opening of width from a first opening width to a second opening width greater than said first opening width, and a second portion having a decreasing opening width from said second opening width to a third opening width.

3. The solar thermal panel as recited in claim 2, in which inner sides of said tine, between said tips and above said base, define substantially convex surfaces.

4. The vacuum solar thermal panel with pipe housing according to claim 3, wherein said tines of said retention element comprise retaining edges at their tips and define said opening inlet includes a fourth opening width, than said second opening width.

5. The vacuum solar thermal panel with pipe housing according to claim 4, wherein said second opening width has a value in range of 110-150% of a diameter of said pipe.

6. The vacuum solar thermal panel with pipe housing according to claim 4, wherein said fourth opening width has a value in range of 90-97% of a diameter of said pipe.

7. The vacuum solar thermal panel with pipe housing according to claim 3, wherein said retention element comprises a stainless steel.

8. The vacuum solar thermal panel with pipe housing according to claim 3, wherein, in a width corresponding to an axial direction of said pipe, said base portion and said retention elements with its tines having a substantially constant thickness.

9. The vacuum solar thermal panel with pipe housing according to claim 1, further comprising:
   spacers disposed in a transverse direction with respect to the base portions of the retention elements and provided with uprights support elements abutting against a glass plate of the vacuum solar thermal panel.

10. The vacuum solar thermal panel with pipe housing according to claim 9, further comprising:
    a continuous solar absorber provided with holes for allowing the uprights support elements of the spacers to cross the continuous solar absorber and abut against the glass plate of the vacuum solar thermal panel.

* * * * *